(12) United States Patent
Skinner

(10) Patent No.: X2899
(45) Date of Patent: Jan. 17, 1818

(54) ? COTTON, & WOLLEN,MANUFACTURING

(76) Inventor: Elijah Skinner

Elijah Skinner.
Letters Patent

The schedule referred in these Letters Patent and making part of the same containing a description in the words of the said Elijah Skinner himself of his improvement, being a machine for the manufacturing of cotton, woollen, and tow yarn, and method of application.

---

This machine is intended as an improvement on the patent head the common woollen wheel and quill wheel, and differs materially from either of them in its construction, method of application and advantages. through a bench fourteen inches in height and two feet nine inches in length, passes a post at each end of the bench two feet in height, calculated to be fastened in the bench at any assignable distance by hands or catches; the other end of each post is made fast in a beam four feet in length, and sufficiently large to give strength and firmness to the work. two feet of the beam are solid through. the remaining two feet is a mortice twenty inches in length and one inch and one quarter of an inch in width. on the solid part of the beam is fixed a sliding post made fast by a key or screw; in this post three inches from the upper side of the beam is fixed an iron axis on which plays a wooden framed wheel two feet in diameter and a proportionably heavy rim will make its rotation easy and firm. around this wheel are two niches for a double band, which connects with a wheel two inches and a half in diameter which is made fast to the side of a second wheel nine inches in diameter and made very thin and light; and which plays with steel or brass boxes on steel points, one of which is a screw, within the above named mortice. a single barrel connects this wheel with a common whirl on a "patent head" spindle, or similar to one, attached to a head constructed for a common wheel, but moveable in the aforenamed mortice and made fast by a screw or key. This machine may be raised or lowered, lengthened or shortened, to accommodate persons of different sizes, standing or sitting; and is peculiarly adapted for the ease of the feeble, infirm and children. On this machine a person can spin much more and better yarn in a day than on any other

United States Patent

Patent No.: X2899 may be fixed on the bench under the small wheel -
Witnesses
Will Cooke
Samuel Emerson Elijah Skinner Rec'd
W.H.C.

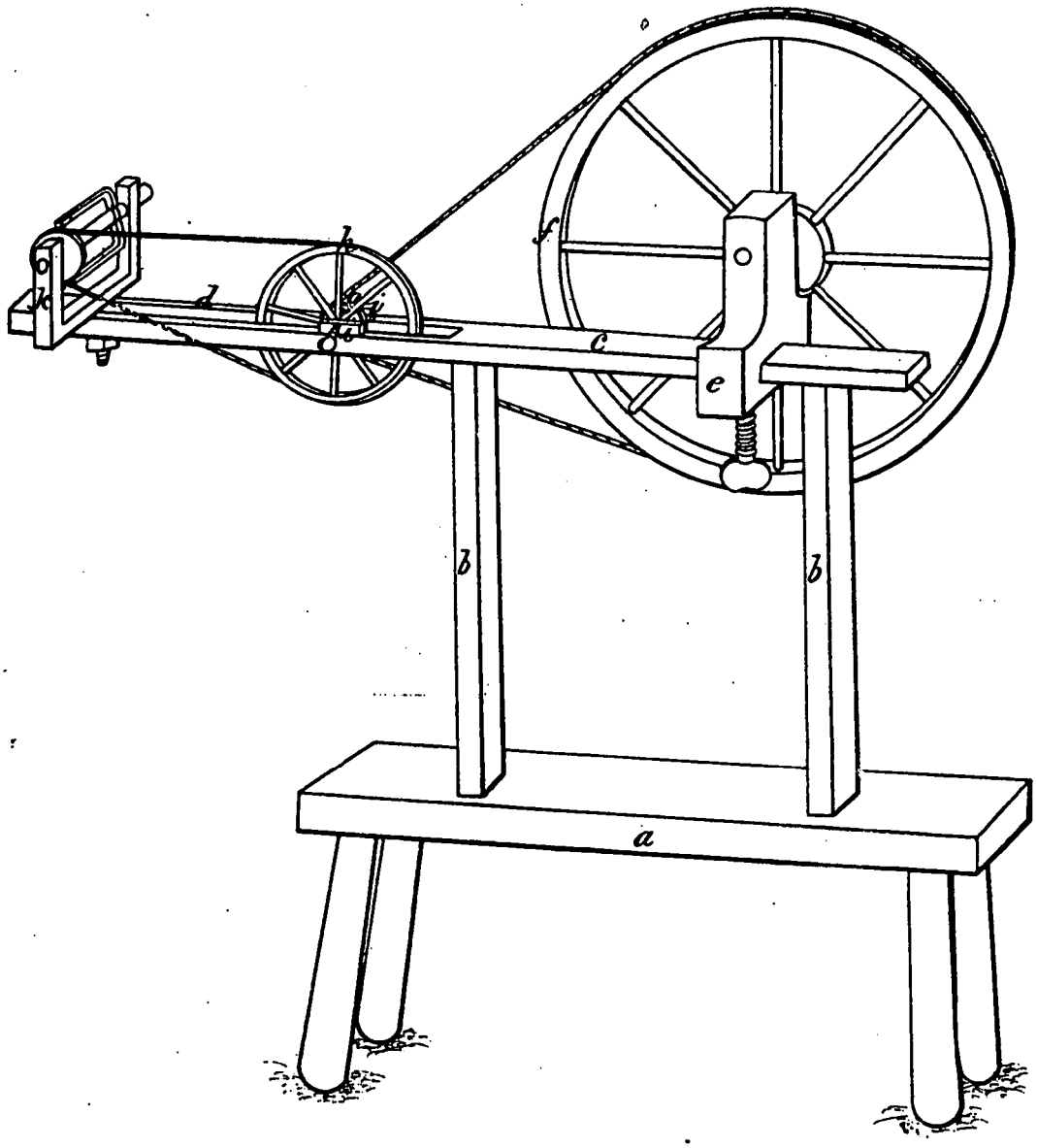

United States Patent Patent No.: X2899
E. Skinner.
Domestic Spinning.
Patented Jan. 17, 1818.